(12) United States Patent
Feng

(10) Patent No.: US 11,374,720 B2
(45) Date of Patent: Jun. 28, 2022

(54) DETERMINING A LENGTH OF A TIMEOUT PERIOD

(71) Applicant: SIGNIFY HOLDING B.V., Eindhoven (NL)

(72) Inventor: Lei Feng, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/284,873

(22) PCT Filed: Oct. 10, 2019

(86) PCT No.: PCT/EP2019/077498
§ 371 (c)(1),
(2) Date: Apr. 13, 2021

(87) PCT Pub. No.: WO2020/078827
PCT Pub. Date: Apr. 23, 2020

(65) Prior Publication Data
US 2021/0391968 A1    Dec. 16, 2021

(30) Foreign Application Priority Data

Oct. 18, 2018 (WO) ............... PCT/CN2018/110839
Dec. 18, 2018 (EP) ................................... 18213598

(51) Int. Cl.
*H04L 5/00* (2006.01)

(52) U.S. Cl.
CPC .......... *H04L 5/0058* (2013.01); *H04L 5/0078* (2013.01)

(58) Field of Classification Search
CPC ..... H04L 5/0058; H04L 5/0078; H04L 29/08; H04W 52/0248; H04W 52/0258; H04W 52/028
See application file for complete search history.

(56) References Cited

U.S. PATENT DOCUMENTS

| | | | |
|---|---|---|---|
| 2005/0169305 A1* | 8/2005 | Mori | H04W 24/00 370/466 |
| 2006/0187916 A1* | 8/2006 | Vasseur | H04L 12/56 370/389 |
| 2016/0278187 A1 | 9/2016 | Amer et al. | |
| 2017/0064633 A1* | 3/2017 | Jia | H04W 52/0258 |
| 2017/0142675 A1 | 5/2017 | Ljung | |
| 2017/0172415 A1 | 6/2017 | Wik et al. | |

FOREIGN PATENT DOCUMENTS

| | | |
|---|---|---|
| CN | 105577507 A | 5/2016 |
| WO | 2009134453 A1 | 11/2009 |

* cited by examiner

*Primary Examiner* — Khoa Huynh

(57) ABSTRACT

A method for determining information about a length of a timeout period, which represents a length of time without communication after which a device of a first type becomes unreachable. Information about the timings of successful and unsuccessful message sent to the device(s) of a first type is obtained, alongside information about the timings of messages sent by the device(s) of the first type, and used to calculate the length of a timeout period.

15 Claims, 3 Drawing Sheets

DETERMINING A LENGTH OF A TIMEOUT PERIOD

CROSS-REFERENCE TO PRIOR APPLICATIONS

This application is the U.S. National Phase application under 35 U.S.C. § 371 of International Application No. PCT/EP2019/077498, filed on Oct. 10, 2019, which claims the benefits of European Patent Application No. 18213598.8, filed on Dec. 18, 2018 and Chinese Patent Application No. PCT/CN2018/110839, filed on Oct. 18, 2018. These applications are hereby incorporated by reference herein.

FIELD OF THE INVENTION

The invention relates to the field of wireless networks, and in particular to methods of determining communication information of nodes of wireless networks.

BACKGROUND OF THE INVENTION

Wireless networks are becoming increasingly common. One example of a wireless network is a Low-Power Wide-Area Network (LPWAN), which has been proposed to fill a technological gap that exists between the well-known technologies of wireless sensor networks and wide area networks. A LPWAN is a wireless Wide-Area network technology specialized for interconnecting devices with only a low bit-rate communication capability, over a wide area and with low cost. Typically, a LPWAN is used for battery powered devices, resource-restricted units, or power-harvesting devices, such as solar-powered devices.

Popular LPWAN technologies include, for cellular applications, the NarrowBand IoT (NB-IoT) standard or the enhanced Machine Type Communications (eMTC) protocol. Another popular LPWAN technology is LoRaWAN.

There has been a growing interest in using LPWAN technology in new industries, especially the automotive, utility (e.g. lighting or water), agricultural and health industries. In these applications, end nodes of a LPWAN consist of peripheral input and/or output devices, and may include, for example, water meters, gas detectors, car monitoring systems, personal healthcare monitoring products and/or wireless luminaires. Typically, end nodes are unable to route received information to other devices in the LPWAN.

In LPWANs, there has been a growing trend in reducing the power consumption of the nodes of the LWPAN, and especially end nodes, e.g. to improve a battery life and minimize traffic.

US2017142675A1 discloses a node of a cellular network comprising an interface configured to communicate with a terminal on a time-synchronized communication channel implemented on a radio link of the cellular network; and at least one processor configured to receive, via the interface from the terminal, a message including data associated with a service implemented by the terminal and the node, the message having been transmitted by the terminal on the channel at a first point in time, wherein the at least one processor is configured to determine a timeout point in time of communication associated with the service based on the first point in time.

SUMMARY OF THE INVENTION

The invention is defined by the claims.

According to examples in accordance with an aspect of the invention, there is provided a method of determining information about a length of a timeout period, the timeout period representing a period of time, following a device of a first type in a wireless network sending an uplink message, after which the device of the first type is unable to receive a downlink message. The method comprises: obtaining first timing information indicating times at which historic uplink messages were sent by at least one device of the first type; obtaining second timing information indicating times at which historic downlink messages were sent to one or more of the at least one devices of the first type; obtaining success information indicating which of the historic downlink messages were successfully received by the one or more devices of the first type, thereby indicating successful historic downlink messages and unsuccessful historic downlink messages; and determining information about a length of the timeout period based on the first timing information, the second timing information and the success information.

It is known that some devices of (wide area) networks are unable to receive messages ("downlink messages") a period of time ("timeout period") after sending a message ("uplink message"). Of course, during the timeout period, such devices are able to receive messages ("downlink messages") from other devices or from the server. In examples, if a device receives a message during the timeout period, the timeout period may be reset to keep the channel open for further communications.

One reason for the timeout period is that a device may be adapted to enter a power saving mode shortly after sending a message (i.e. after a timeout period), in which they are unable to receive communications or messages from other devices or from the server. This is with the intention of saving power, as devices in some wireless networks are resource-restricted. Devices may exit the power saving mode when they send a message (i.e. and can again receive messages).

Another cause for the timeout period could be that network elements (e.g. base station, NAT or Firewall routers) may be adapted to close a channel to the device if there is no traffic along the channel to/from the device for a predetermined period of time, i.e. the timeout period. This may be performed with the aim of saving power, sharing the network resources among devices or reducing traffic load.

The present invention recognizes a desire to accurately and effectively identify the length of this timeout period. It would also be advantageous to provide a generic method that could be employed irrespective of design, location, regional or operator considerations.

Knowledge of the length of a timeout period could advantageously allow appropriate scheduling of messages to the device (i.e. thereby avoiding sending messages to the device(s) that will not be received). The length of a timeout period could also be exploited to set a periodicity of update messages (e.g. "heartbeat messages") sent by the device in order to keep the communication channel open.

The present invention proposes a method of establishing information about the length of the timeout period (e.g. upper and lower bounds for the possible length), through information on timings of historic messages sent to/from the device(s) and the success of historic messages sent to the device(s). By way of example, this information could be processed to estimate upper and lower values (i.e. information) estimating the length of the timeout period.

Preferably, the first timing information indicates times at which historic uplink messages were sent from two or more (i.e. a plurality of) devices of the first type in the wireless network. Preferably, the second timing information indicates times at which historic downlink messages were sent to the two or more devices of the first type in the wireless network.

The information about the length of the timeout period may include, for example: a lower bound for the length of the timeout period; an upper bound for the length of the timeout period; an estimated length of the timeout period and/or an error margin for the estimated length of the timeout period.

A lower bound of the length of the timeout period would indicate a length of time (following sending of an uplink message) at and/or before which it is known/estimated that a device of the first type will be able to receive a message. An upper bound of the length of the timeout period indicates a length of time (following sending of an uplink message) at and/or after which it is known/estimated that a device of the first type will be unable to receive a message.

As used herein, the term "device of a first type" refers to devices that communicate in a same or similar manner (e.g. have similar or identical lengths of timeout period). In particular, devices of a first type may consist of a group of devices that work/operate in the same manner (sharing the same timeout settings that impact on the ability to receive downlink messages after sending an uplink message). Thus, it can be assumed that the length of the timeout period for each device of the first type is the same. In examples, all devices of the first type are associated with a same base station or router of the network. In preferable embodiments, the at least one device of a first type comprises a plurality of devices of the first type.

In at least one embodiment, the step of determining information about a length of the timeout period comprises: processing the first and second timing information to determine first differences, each first difference being a difference between a time at which a successful historic downlink message was sent to a device of the first type and a time at which a historic uplink message, temporally closest and temporally preceding a respective successful historic downlink message, was sent by the same respective device of the first type; and determining information about the length of the timeout period based on the determined first differences.

Thus, information about the length of a timeout period may be obtained by identifying successfully received (by a device of the first type) downlink messages. Successfully received messages indicate that the accompanying downlink messages were received during the timeout period, and can thereby provide information on the length of the timeout period.

In further embodiments, the step of determining information about the length of the timeout period comprises determining that the largest of the determined first differences is a lower bound of the length of the timeout period.

Thus, a lower bound is calculated, which represents the largest/longest known length of the timeout period during which device of the first type is still be able to receive messages. Thus, the lower bound of the length of the timeout period may provide an accurate or safe minimum length of the timeout period.

In some embodiments, the step of determining information about a length of the timeout period comprises: processing the first and second timing information to determine second differences, each second difference being a difference between a time at which an unsuccessful historic downlink message was sent to a device of the first type and a time at which a historic uplink message, temporally closest and temporally preceding the respective unsuccessful historic downlink message, was sent by the same respective device of the first type; determining information about the length of the timeout period based on the determined second differences.

Thus, information about the length of a timeout period may be obtained by identifying unsuccessfully received (by a device of the first type) downlink messages. Unsuccessfully received messages indicate that the accompanying downlink messages were not received during the timeout period, and can thereby provide information on the length of the timeout period.

The step of determining information about the length of the timeout period comprises determining that the smallest of the determined second differences is an upper bound of the length of the timeout period.

Thus, an upper bound may be calculated, which upper bound represents the largest/longest known length of the timeout period during which the device of the first type is still able to receive messages. The upper bound may therefore represent a maximum possible length of the timeout period, indicating a period after a device of the first type send a message beyond which it is known that the downlink communications will not be received.

In preferable embodiments, the step of determining information about a length of the timeout period comprises: processing the first and second timing information to determine first differences, each first difference being a difference between a time at which a successful historic downlink message was sent to a device of the first type and a time at which a historic uplink message, temporally closest and temporally preceding the respective successful historic downlink message, was sent by the same respective device of the first type; processing the first and second timing information to determine second differences, each second difference being a difference between a time at which an unsuccessful historic downlink message was sent to a device of the first type and a time at which a historic uplink message, temporally closest and temporally preceding the respective unsuccessful historic downlink message, was sent by the same respective device of the first type; determining that the largest of the determined first differences is a lower bound of the length of the timeout period; and determining that the smallest of the determined second differences is an upper bound of the length of the timeout period.

In other words, the method may be adapted to comprise determining first time differences, being a difference in time between a successful downlink message to a device and an immediately preceding uplink message from that device, as well as second time differences, being a difference in time between an unsuccessful downlink message to a device and an immediately preceding uplink message from that device. These two differences may be processed to identify upper and lower bounds for the timeout period, thereby indicating a range of values in which it is determined that the timeout period may fall.

Thus, both an upper and lower bound of the length of the timeout period can be determined.

The method may further comprise generating an alarm in response to the upper bound of the length of the timeout period being less than the lower bound of the length of the timeout period.

The inventors have recognized that if the upper bound of the length of the timeout period is determined to be less than a lower bound of the length of a timeout period, then it can be identified that the calculation of upper limit has been performed incorrectly and thus an alarm can be generated.

For example, packet loss in the network may cause downlink messages to be deemed unsuccessfully received by a device of the first type (e.g. due to non-delivery of the downlink message or non-delivery of an acknowledgment message to a downlink message). Thus, miscalculation of the upper bound (i.e. via the alarm) could be used as an indicator that there is (significant) packet loss in the wireless network.

Thus, in some embodiments, if the upper bound of the length of the timeout period is less than the lower bound, the upper bound may be discarded (or set aside) and the upper bound recalculated. Thus, the alarm may be a signal indicating an instruction to recalculate the upper bound of the length of the timeout period.

In some embodiments, the lower and/or upper bound of the timeout period may, in response to the alarm signal, be double confirmed by processing more uplink-downlink pairs.

The method may further comprise controlling each at least one device of the first type to send periodic uplink messages, wherein an interval between the periodic uplink messages is controlled based on the information about the length of the determined timeout period.

As previously explained, an interval between periodic uplink messages sent by the device(s) of the first type may be set to keep the communication channel open. Such periodic uplink messages may also be labelled "heartbeat messages". By setting the length of the periodic uplink message based on information of the length of the timeout period, a communication channel to each device of the first type can be kept open, to ensure that it is possible to continually communicate with the device of the first type.

In embodiments, the controlling each one or more of the devices of the first type comprises: identifying any devices of the first type that are currently sending periodic uplink messages; determining, for each identified device, a current interval between the periodic uplink messages; and controlling, for each identified device, a length of the interval between the periodic uplink messages further based on the respective current interval of that identified device.

In other words, a determination of whether to adjust the interval between periodic uplink messages sent by a device of the first type may depend upon both the current interval and information about a length of a timeout period (e.g. an upper or lower bound of the timeout period).

Embodiments of the method comprise controlling each at least one device of the first type to send periodic uplink messages; and controlling the interval between the periodic uplink messages to be no less than the lower bound of the length of the timeout period.

Thus, the interval between the periodic uplink messages may be set to be equal to a value known to less than or equal to a length of the timeout period, to ensure that a communication channel to each device of the first type remains open.

In embodiments, the controlling each at least one device of the first type comprises: identifying any devices of the first type that are currently sending periodic uplink messages; determining, for each identified device, a current interval between the periodic uplink messages; and controlling, for each identified device, a length of the interval between the periodic uplink messages to be equal to the lower bound of the length of the timeout period in response to the current interval being less than the lower bound of the length of the timeout period.

This provides a more efficient network system. If the current interval between sending periodic messages for a device of the first type is less than a lower bound, then it can be established that said device of the first type is sending periodic messages at a faster frequency than required to keep a communication channel to that device open (and thereby potentially wasting energy and using unnecessary network capacity). Thus, modifying the periodic interval to be, at a minimum, the length of the lower bound, a more efficient wireless network can be provided.

The method may be adapted to comprise controlling each at least one device of the first type to send periodic uplink messages; and controlling the interval between the periodic uplink messages to be less than the upper bound of the length of the timeout period.

The upper bound of the length of the timeout period represents a period of time after a device (of the first type) sending an uplink message at/after which it is known that downlink messages will not be received by the device. By setting the periodic interval to be less than the upper bound, a likelihood that the communication channel to the device will remain open is significantly increased.

The method may further comprise controlling each at least one device of the first type to send periodic uplink messages, wherein the controlling comprises: identifying any devices of the first type that are currently sending periodic uplink messages; determining, for each identified device, a current interval between the periodic uplink messages; and controlling the interval between the periodic uplink messages to be no less than the lower bound of the length of the timeout period and less than the upper bound of the length of the timeout period.

In further embodiments, the method comprises at least one of the following: controlling, for each identified device, a length of the interval between the periodic uplink messages to be equal to the lower bound of the length of the timeout period in response to the current interval being less than the lower bound of the length of the timeout period; controlling, for each identified device, a length of an interval between the periodic uplink messages to be equal to the lower bound of the length of the timeout period in response to the current interval being greater than or equal to the upper bound of the length of the timeout period; and controlling, for each identified device, a length of an interval between the periodic uplink messages to be equal to the current interval in response to the current interval being greater than or equal to the lower bound of the length of the timeout period and less than the upper bound of the length of the timeout period.

There is also proposed a computer program comprising code means for implementing any described method when said program is run on a computer.

According to examples in accordance with an aspect of the invention, there is also provided an information determiner adapted to determining information about a length of a timeout period, the timeout period representing a period of time, following a device of a first type in a wireless network, sending an uplink message, after which the device of the first type is unable to receive a downlink message, the information determiner comprising: a collection module adapted to: obtain first timing information indicating times at which historic uplink messages were sent by at least one device of the first type in the wireless network; obtain second timing information indicating times at which historic downlink messages were sent to one or more of the at least one device of the first type in the wireless network; and obtain success information indicating which of the historic downlink messages were successfully received, thereby indicating successful historic downlink messages and unsuccessful historic downlink messages, and a decision module adapted to determine information about a length of the timeout period based on the first timing information, the second timing information and the success information.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
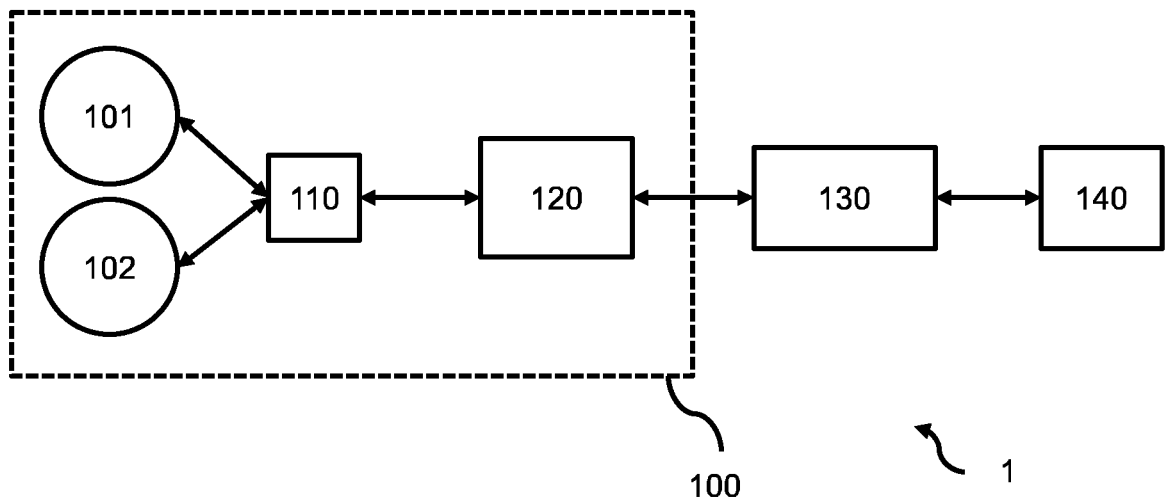
FIG. 1 illustrates a network system comprising a wireless network.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

According to a concept of the invention, there is proposed a method for determining information about a length of a timeout period, which represents a length of time without communication after which a device of a first type becomes unreachable. Information about the timings of successful and unsuccessful message sent to the device(s) of a first type is obtained, alongside information about the timings of messages sent by the device(s) of the first type, and used to calculate the length of a timeout period.

Embodiments are at least partly based on the realization that there is a desire to automatically calculate a length of the timeout period, and that this can be performed using information of successful/unsuccessful downlink messages sent to a device of the first type. Embodiments are also based on the realization that a large amount of data can be obtained by pooling information obtained detailing communications to more than one device of the first type, so that accurate information about the length of the timeout period can be obtained.

Illustrative embodiments may, for example, be employed in wireless networks, and in particular to resource-restricted wireless networks such as LPWANs. In embodiments, the devices of a first type comprise a group of end nodes of a resource restricted wireless network, e.g. an LPWAN.

FIG. 1 illustrates a wireless network 100 in which embodiments of the invention may be employed, for improved contextual understanding of the invention. The wireless network 100 forms part of a network system 1.

In particular, FIG. 1 shows a typical wide area wireless network 100, such as those employable for a lighting system (i.e. for controlling luminaires). Devices in the wireless network communicate using a wireless network protocol, such as an LPWAN protocol (e.g. a NB-IoT wireless network protocol).

End nodes 101, 102 of the wireless network 100 represent devices of interest, e.g. devices that a user may wish to monitor and/or control, and are considered to be examples of a "device of the first type" later described. Examples of appropriate end nodes include sensors, meters or luminaires. In a particular embodiment, each end node comprises an intelligent luminaire equipped with an NB-IoT enabled lighting control unit (LCU), which is considered to be an example of a "device of the first type" later described.

A base station 110 (e.g. an evolved Node B element) of the wireless network 100, also called a gateway, and network controller 120 (e.g. an IoT core) comprise the necessary equipment to facilitate communication with the end nodes 101, 102.

The base station 110 and network controller 120 are both typically maintained and operated by a network operator who is able to offer access to the network 100 to an application provider (e.g. enables application server(s) 140 to connect with the end nodes via the wireless network).

A (IoT) platform 130 facilitates communications between the network controller 120 and an application server(s) 140, and could be maintained by either the network operator, an independent service provider or the application provider themselves. By way of example, a platform 130 may communicate with a cloud-computing arrangement 140 to provide additional processing power (e.g. to provide services or applications) to nodes of the wireless network 100.

An application server(s) 140 is provided by an application provider to offer applications to operators of the end nodes 101, 102 (through the wireless network 100), such as web-based control or monitoring of the end nodes. In a lighting system, an application server 140 may provide a portal application, such as CityTouch.

However, resource limitation practices (i.e. modes of operation) used by wireless networks 100 may mean that the end nodes 101, 102 may not be always reachable by the application server(s) 140, or even other elements disposed in a communication channel between the end nodes 101, 102 and the application server(s), such as the platform 130. This is particularly true in wireless networks 100 operating under a communication protocol designed for low-power operation in which envisaged network traffic is primarily formed of uplink messages (such as wireless networks for sensing devices, such as water meters or gas detectors), and receipt of downlink message by end nodes is less important or lacks urgency. Examples of such wireless networks protocols include Low Power Wide Area Networks (LPWANs) protocols.

Known methods for resource limitation of wireless networks include tearing down a communication channel to an end node if there is no traffic to/from that node on the network for a certain period of time (i.e. a "timeout period"). This timeout period may be inherent to the node (e.g. a node enters a power saving mode after a certain period of time has elapsed without sending/receiving a communication). In other examples, the timeout period may be instigated at the network or platform level. In another example, a network address translator (NAT), which is usually used positioned between a mobile operator's private network and the internet and may form part of the network controller 120, tears down the link from the public network (e.g. between the network controller 120 and the application server 140) to the private network 100 if there is no traffic for a while. Other reasons for a timeout period will be apparent to the skilled person Whilst these limitations may be acceptable for some wireless networks, they are less preferable in embodiments where control of or communication with the end nodes 101, 102 is important (e.g. wireless networks for lighting applications, where there is a desire to immediately pass control signals to lighting devices).

Thus, there is a desire to take account of the resource limitations of a wireless network, and ensure that nodes (e.g. end nodes 101, 102) of the network are reachable at any time—e.g. to react and respond to control signals from the application server(s) 140.

One method would be to modify the end nodes 101, 102 so that they transfer data (e.g. to the network controller 120 or application server(s) 140) at suitably regular or periodic intervals so that a communication channel to the end node remains open. Thus, the nodes may be modified to send periodic messages, or so-called "heartbeat messages". It is important to appropriate set the interval between heartbeat messages. Too short an interval means more redundant/unnecessary messages are sent by an end node, more resources are used, and a greater data traffic cost. However, too long an internal may result in the end node being unreachable (for at least a period of time), which is not preferred.

Under current system designs, a user could ask the operator of the wireless network 100 (or consult literature of the network) to obtain the length of the timeout period in order to appropriately set the interval between heartbeat messages. However, such a method is unreliable because: the operator may (unexpectedly) change the length of the timeout period for a variety of reasons (e.g. to allow more devices on the network or reduce costs); different groups of devices may be controlled by different operators; and timeout periods may be set differently in different regions. There is therefore a desire to accurately and automatically detect the length of the timeout period (e.g. for updating the interval between heartbeat messages accordingly).

Of course, there may be other reasons for wanting to accurately and automatically detect the length of the timeout period (e.g. to determine when it is safe to send messages to an end node after receiving an uplink message from that node).

Figure 2:
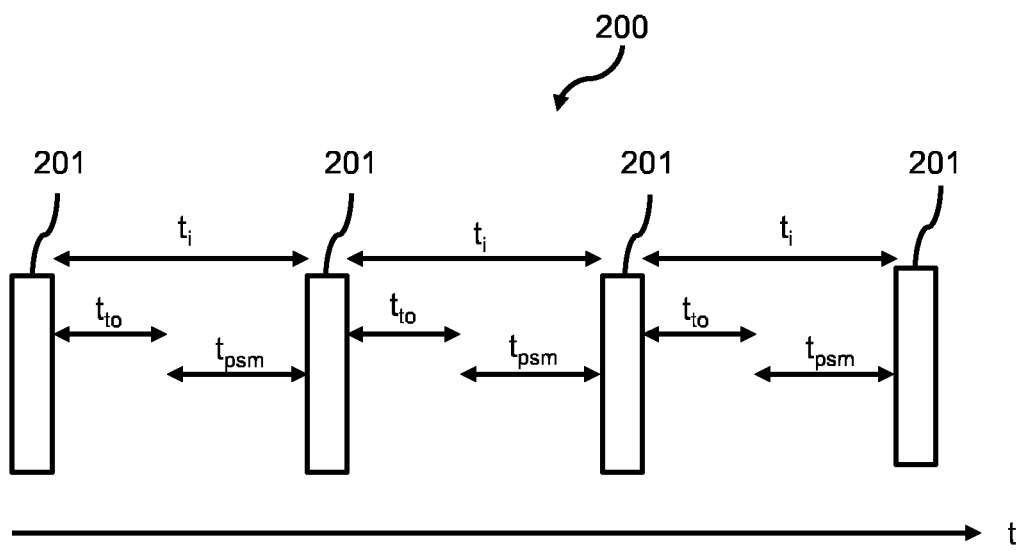
FIG. 2 illustrates a timing diagram for messages sent by a device of a first type.

For improved understanding, FIG. 2 provides a timing diagram 200 illustrating messages sent by a device according to an example. The diagram 200 illustrates a plurality of periodic messages 201 sent over time t.

The device is adapted to enter a power saving mode after a certain period of time ("timeout period" $t_{to}$) has elapsed without sending/receiving a communication. The device is also adapted to send heartbeat messages 201 at regular intervals $t_i$ (e.g. to provide current status information, regular sensing information and so on). That is, there is an interval $t_i$ between periodic messages 201 sent by a device.

During a timeout period to after sending a message 201, the device is able to receive communications from other devices (e.g. in the same network or able to pass a communication to the network). After the timeout period $t_{to}$, the device enters a power saving mode, in which it is unable to receive communications from such devices. Thus, for a period of time $t_{psm}$ from the end of the timeout period $t_{to}$ to the sending of the next heartbeat message 201, the device is unable to receive communications, i.e. the device becomes unreachable. This period of time $t_{psm}$ can be labelled the "unreachable time period". Of course, during the timeout period, the said node/device is able to receive communications, and the timeout period may be reset if a communication is received during the timeout period.

In other words, the timeout period represents a period of time, following a device of a first type in a wireless network sending an uplink message, after which the device of the first type is unable to receive a downlink message.

As previously set out, for some embodiments, there is a desire to minimize the length of the unreachable time period, e.g. to maintain a communication channel to the device. This can be achieved by setting the length of the interval $t_i$ between periodic messages sent by the device to being no greater than the timeout period $t_{to}$.

Thus, there is a desire to determine a length of the timeout period $t_{to}$ of the device. Of course, there are other reasons to determine the length of the timeout period $t_{to}$ (e.g. to determine whether the end node is reachable for a one-off communication).

The inventors have therefore recognized the desire to identify the length of this timeout period (e.g. by devices external to the identified node/device). However, the length of the timeout period can vary for different devices and/or networks (due to variations in networks communication protocols and power saving modes of nodes). Proposed methods therefore relate to a method of automatically identifying information about a length of a timeout period without needing human intervention or needing to request an operator of a network/node.

Figure 3:
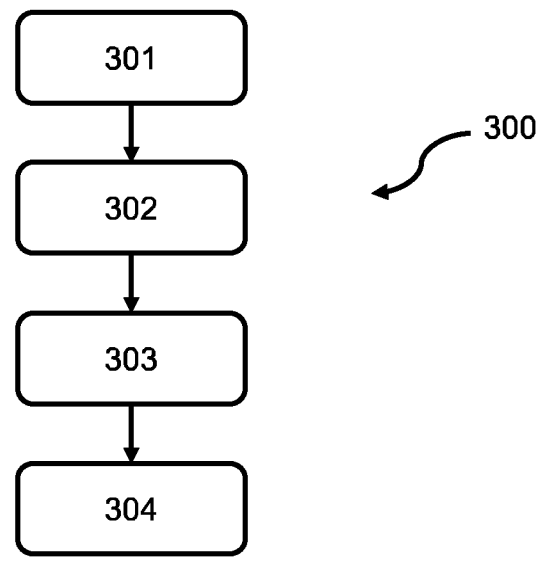
FIG. 3 illustrates a method according to an embodiment.

FIG. 3 illustrates a method 300 of determining a length of a timeout period according to an embodiment.

The method comprises a step 301 of obtaining first timing information indicating times at which historic uplink messages were sent by at least one device of a first type.

The term "devices of a first type" refers to devices in a same network condition (e.g. devices that communicate with a same base station), so that all devices of the first type can be assumed to have an identical timeout period. Thus, "devices of a first type" have substantially identical timeout periods (e.g. ±1% to account for possible different network delay). "Devices of a first type" may therefore comprise a group of one or more devices for which a timeout period can be assumed to be the same (e.g. configured/controlled to have similar communication timings), where all devices in the group are preferable downstream of a same base station.

Using the wireless network 100 (illustrated in FIG. 1) as an example, the devices of a first type may be formed of the end nodes 101, 102, each of which communicates with a same base station 110 and are configured to have a same, albeit unknown, timeout period (e.g. by the network operator).

There are various different types of uplink messages (e.g. heartbeat, status update, command response) that could be sent by a device of the first type. Step 301 may comprise obtaining first timing information indicating times at which any of these uplink messages were sent by a device(s) of the first type.

For the avoidance of doubt, as used herein, "uplink message" is a message that is sent from the device(s) of the first type. A "downlink message" is a message that is sent to the device(s) of the first type. The term "message" is used to refer to any instance of communication between nodes of a wireless network, and may be formed of a single packet.

Step 301 therefore comprises obtaining timing information indicating when uplink message(s) were sent by the device(s) of the first type, e.g. to an application server or to a network controller.

The method 300 also comprises a step 302 of obtaining second timing information indicating times at which historic downlink messages were sent to one or more of the at least one devices of the first type.

The second timing information thereby indicates when other devices or application servers attempted to reach a device of the first type (with a downlink message). A downlink message may, for example, be a request for a status update, a command, an instruction, control information and so on.

The first and/or second timing information may comprise, for example, one or more timestamps indicative of when an appropriate message was sent and/or received.

The method 300 also comprises a step 303 of obtaining success information indicating which of the historic downlink messages were successfully received by the one or more devices of the first type, thereby indicating successful historic downlink messages and unsuccessful historic downlink messages.

There are various envisaged or possible ways for determining whether a downlink message has been successfully or unsuccessfully received (i.e. for obtaining the success information).

In some embodiments, the devices of the first type may be adapted to respond or acknowledge a downlink message (e.g. with a response message), such that issuance of a response message by a device of the first type to a particular downlink message is an indicator that a historic downlink message has been successfully received. Thus, obtaining success information may comprise obtaining information about response messages sent by the device(s) of the first type.

In other embodiments, each downlink message may comprise a command, and step 303 may comprise determining whether the device of the first type has followed the command (indicating that it has received the downlink message). This may be performed, for example, by checking status updates of the device(s) (such as contained in a heartbeat message)—which could indicate whether the device has adhered to a command of a downlink message, or by a sensor adapted to check whether the device has adhered to the command. By way of example, a downlink command to a luminaire (being an example of a device of the first type) may instruct the luminaire to change dimming setting, for which a light sensor or power meter may be able to detect whether the luminaire has adhered to the command.

The method 300 then comprises a step 304 of determining information about a length of the timeout period based on the first timing information, the second timing information and the success information.

Thus, information about the length of a timeout period of devices of a first type can be determined based on information indicating whether downlink messages were successfully received by said devices (as well as timing information of the downlink messages and uplink messages sent by the devices).

In particular, the inventors have recognized that an unsuccessful downlink message may indicate that the timeout period had elapsed at the time of sending the unsuccessful downlink message, whereas a successful downlink message indicates that the timeout period had not elapsed at the time of sending the successful downlink message. Thus, information about the success of the downlink message can be processed to generate information about the length of the timeout period.

In particular, a difference between a time of sending a successful downlink message to a device and a time of sending an immediately preceding uplink by that device is an example of a period of time falling within a possible range of the timeout period. A difference between a time of sending an unsuccessful downlink message to a device and a time of sending an immediately preceding uplink by that device is an example of a period of time falling outside a possible range of the timeout period.

Thus, time differences between sending downlink messages and corresponding immediately preceding uplink messages can be used, together with information indicating the success/failure of the downlink messages, to define a possible range for the timeout period. In this way, information on a length of the timeout period can be determined.

Step 304 may comprise processing the first and second timing information to determine differences between a time at which a historic downlink message was sent to a device of the first type and a time at which a historic uplink message (immediately preceding the historic downlink message) was sent by that same device of the first type. Thus, each device of the first type may be associated with a set of one or more differences (representing communications to and from that device).

The differences may comprise first differences, being differences between successful historic downlink message and corresponding uplink messages, and/or second differences, being differences between unsuccessful historic downlink messages and corresponding uplink messages. In embodiments, the differences do not comprise one of the first and second differences. However, in preferable embodiments, the differences includes both the first and second differences.

The first differences indicate possible values for a lower bound for the timeout period, being a minimum possible value that the timeout period can be. Thus, a largest of the first differences can be considered to be the best selection for a lower bound for the timeout period. Thus, embodiments may comprise selecting the largest of the first differences as a lower bound for the timeout period.

The second differences indicate possible values for an upper bound for the timeout period, being a maximum possible value that the timeout period can be. A smallest of the second differences may be considered to the best selection for an upper bound for the timeout period.

Thus, embodiments may comprise selecting the smallest of the second differences as an upper bound for the timeout period.

In some embodiments, the smallest of the second differences for which another of the second differences falls within a predetermined margin (e.g. ±1% or ±5%) is selected as the upper bound for the timeout period. This embodiment aims to take into account possible packet loss in the network, which could cause downlink messages sent within the timeout period to be unsuccessfully received (which could lead to an inaccurate assessment of the upper bound of the timeout period being performed). By only selecting a second difference for which another of the second differences falls within a predetermined margin, then the possibility of selecting a difference associated with a downlink message which was sent in the timeout period, but was subject to packet loss, is reduced. Thus, a more accurate assessment of the upper bound can be attained.

The proposed invention can use information about messages sent to and from any devices of the first type to determine information about the length of the timeout period. This is because it can be assumed that all devices of the first type have a same timeout period. In particular, (first and/or second) differences associated with any of the devices of the first type can be pooled to provide a group of first and/or second differences, which can be processed to determine an upper and/or lower bound of the timeout period shared by the devices of the first type. Embodiments thereby increase a probability that information about a timeout period will be accurate, as a larger pool of examples for determining information about the timeout period is used.

Figure 4:
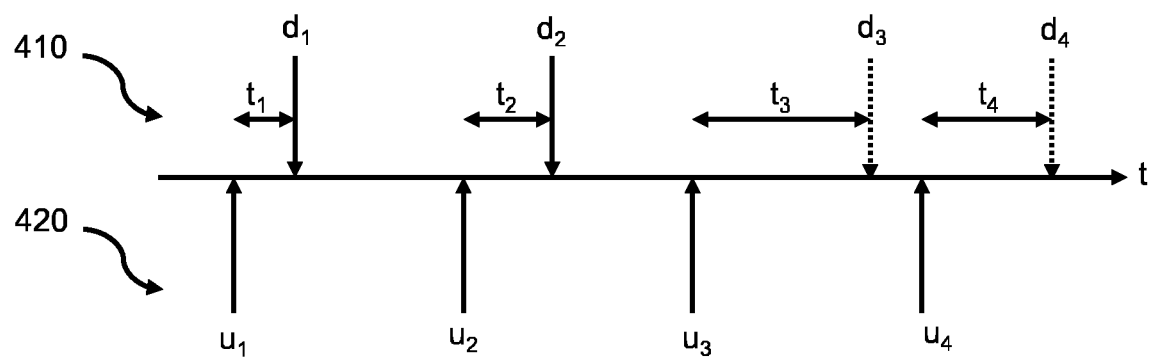
FIG. 4 illustrates a timing diagram for example messages sent to and from a device of a first type.

FIG. 4 illustrates a timing diagram illustrating example downlink messages 410 sent to a device of the first type and example uplink messages 420 sent by a device of the first type over time t. FIG. 4 can be used to more fully understand an embodiment of step 304.

Here, the uplink messages $u_1$, $u_2$, $u_3$, $u_4$ are sent at periodic intervals. The downlink message $d_1$, $d_2$, $d_3$, $d_4$ are sent at times after (but not necessarily in response to) the sending of an appropriate uplink message $u_1$, $u_2$, $u_3$, $u_4$. A first $d_1$ and second $d_2$ downlink message (illustrated in solid lines) are successfully received by the device of the first type. A third $d_3$ and fourth $d_4$ downlink message (illustrated in dashed lines) are not received by the device of the first type.

$t_x$ represents the interval between the time at which a downlink message $d_x$ was sent to the device and the time at which an immediately previous uplink message $u_x$ was sent by that same device (i.e. one of the first or second differences).

If a downlink command $d_x$ successfully reaches the device, then $t_x$ is a candidate for a lower bound of the timeout period. Thus, as both downlink commands $d_1$ and $d_2$ were successfully received, both $t_1$ and $t_2$ ("first differences") are candidates for a lower bound of the timeout period.

However, if the downlink command $d_x$ cannot reach the device (i.e. it is unsuccessful or a failure), then $t_x$ is a candidate for an upper bound of the timeout period. Thus, as both downlink commands $d_3$ and $d_4$ were not successfully received, both $t_3$ and $t_4$ ("second differences") are candidates for an upper bound of the timeout period.

The largest of the candidates for the lower bound of the timeout period (here: $t_2$) may be selected as the lower bound of the timeout period. The smallest of the candidates for the upper bound of the timeout period (here: $t_4$) may be selected as the upper bound of the timeout period.

Thus, upper and lower bounds represents a range of values in which the timeout period is known to fall. In other words, the upper and lower bounds define an error margin for the length of the timeout period. In particular, it can be identified that the timeout period is no less than the lower bound, and is less than the upper bound of the timeout period.

In some examples, a length of the timeout period can be estimated based on the determined upper and lower bounds (e.g. by averaging the upper and lower bounds). This can be used as a reasonable estimate for the length of the timeout period.

Of course, the upper bound should be larger than the lower bound. Failure to meet this criteria could trigger an alarm. If the upper bound is less than the lower bound, this could indicate one of several options: that there is packet loss in the wireless network; that at least of the devices assumed to be of the first type has a different timeout period (and should therefore be excluded from the monitoring of the devices of the first type); or that the timeout period has changed.

The alarm may therefore indicate that there is packet loss in the network, which could be used to automatically switch to a less lossy communication protocol (e.g. double sending of communications, automatic restarting of elements, implementation of quality of service protocols and so on).

In some embodiments, if the upper bound of the length of the timeout period is less than the lower bound, the identified upper bound may be discarded (or set aside) and the upper bound recalculated or the next smallest second difference used as an upper bound. Thus, the alarm may be a signal indicating an instruction to recalculate the upper bound of the length of the timeout period (or set the next smallest second difference as the upper bound).

In further embodiments, if the upper bound of the length of the timeout period keeps going down (e.g. after multiple alarms have been raised), it may be recognized that the timeout period has changed. The lower bound may then be selected as the timeout period.

In yet other embodiments, a determination may be made as to whether a particular device of the first type provides statistically outlying potential values for the upper or lower bound (e.g. by comparing to other potential values provided by other devices of the first type). In response to such a determination being positive, it may be assumed that the particular device has been incorrectly identified as a device of the first type, and values provided by that device may be discarded (or the device removed from the group of devices of the first type), and new upper and lower bounds recalculated based on the modified group.

Although embodiments have been described in which both the upper and lower bounds for the timeout period are identified, the skilled person will appreciate that, in some embodiments, only one of the upper and lower bounds is identified. This may be useful if embodiments wish to save processing power.

It has previously been explained how determined information about a length of the timeout period may be used to modify or set an interval between periodic messages ("heartbeat messages") sent by a device(s) of the first type. In particular, an interval may be set so as to keep the device(s) of the first type reachable, whilst minimizing an amount of traffic put on the network by the periodic messages. In other words, an interval may be set to be the maximum possible value whilst keeping the device(s) of the first type reachable.

In some simple embodiments, a method may comprise controlling each at least one device of the first type to send periodic uplink messages; and controlling the interval between the periodic uplink messages to be no less than the lower bound of the length of the timeout period. For example, the interval may be set to be equal to the lower bound of the length of the timeout period or an estimated value of the timeout period.

In other embodiments, a method may comprise controlling each at least one device of the first type to send periodic uplink messages; and controlling the interval between the periodic uplink messages to be less than the upper bound of the length of the timeout period. For example, the interval may be controlled to be a predetermined percentage less than the upper bound (e.g. 1% less or 5% less). The upper bound represents a known smallest length of time that the timeout period can be, so that it would be preferable to reduce the periodic interval to being less than this value (to reduce the likelihood that the interval will be insufficiently small to prevent the timeout period expiring between periodic messages).

In other embodiments, a method may comprise controlling each at least one device of the first type to send periodic uplink messages; and controlling the interval between the periodic uplink messages to be equal to an estimated length of the timeout period (e.g. equal to an average of the upper and lower bounds).

In preferable embodiments, the method comprises controlling the interval between periodic messages further based on a current interval between periodic messages of any of the devices of the first type currently sending periodic messages.

Figure 5:
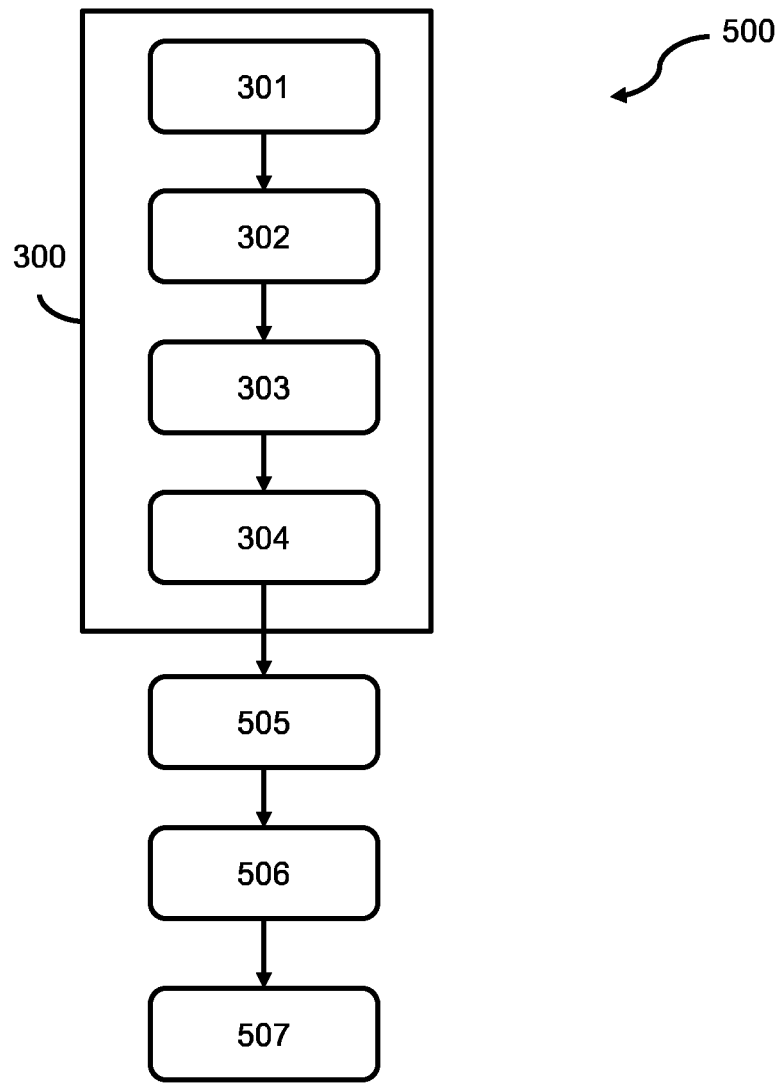
FIG. 5 illustrates another method according to an embodiment.

FIG. 5 illustrates a method 500 according to such an embodiment. The method 500 comprises a process 300 of determining information about a length of the timeout period, such as those previously described.

The method 500 further comprises a step 505 comprises identifying of any devices of the first type that are currently sending periodic uplink messages; a step 506 of determining, for each identified device, a current interval between the periodic uplink messages; and a step 507 of controlling, for each identified device, a length of the interval between the periodic uplink messages further based on the respective current interval of that identified device.

Precise embodiments of step 507 may depend upon the content of the determined information about the length of a timeout period, obtained by process 300.

In one example, where the determined information comprises a lower bound of the length of the timeout period, step 507 may comprise controlling a length of the interval between the periodic uplink messages to be equal to the lower bound of the length of the timeout period in response to the current interval being less than the lower bound of the length of the timeout period.

Step 507 may further comprise controlling, for devices that are not currently sending periodic uplink messages, controlling said devices to send periodic uplink messages in which an interval between the periodic uplink messages is equal to the lower bound of the length of the timeout period.

In another example, where the determined information comprises an upper bound of the length of the timeout period, step 507 may comprise controlling a length of the interval between the periodic uplink messages to be less than the upper bound of the timeout period (e.g. by a predetermined amount, such as 1% or 5%) in response to the current interval being greater than or equal to the upper bound of the length of the timeout period.

Step 507 may further comprise controlling, for devices that are not currently sending periodic uplink messages, controlling said devices to send periodic uplink messages in which an interval between the periodic uplink messages to be less than the upper bound of the timeout period (e.g. by a predetermined amount, such as 1% or 5%).

In a scenario in which the determined information comprises a lower bound of the length of the timeout period and an upper bound of the length of the timeout period, step 507 may comprise a combination of any one or more of the following examples.

In a first example of this scenario, step 507 may comprise controlling, for each identified device, a length of the interval between the periodic uplink messages to be equal to the lower bound of the length of the timeout period in response to the current interval being less than the lower bound of the length of the timeout period.

In a second example of this scenario, step 507 may comprise controlling, for each identified device, a length of an interval between the periodic uplink messages to be equal to the lower bound of the length of the timeout period in response to the current interval being greater than or equal to the upper bound of the length of the timeout period.

In a third example of this scenario, step 507 may comprise controlling, for each identified device, a length of an interval between the periodic uplink messages to be equal to the current interval in response to the current interval being greater than or equal to the lower bound of the length of the timeout period and less than the upper bound of the length of the timeout period. By maintaining a current interval, further information about the timeout period can be obtained over time, and used to modify the interval in future iterations of the method.

Of course, step 507 may comprise, for devices that are not currently sending periodic uplink messages, controlling said devices to send periodic uplink messages in which an interval between the periodic uplink messages is identical as that set for one or more the devices that were currently sending periodic uplink messages. For example, the largest current interval may be selected. In this way, all devices of the first type can be controlled to send periodic messages, where an interval between the periodic messages is the same for each device.

It will be appreciated that proposed methods may be iteratively repeated to take account of the newly set interval between periodic messages. This enables tuning of the interval between periodic messages to be performed. For example, the upper and lower bounds may be recalculated each time a new downlink command to a device of the first type is sent.

In some embodiments, method 500 may be adapted to only modify or set an interval between periodic messages (based on information about the length of the timeout period) for only a selection or subset of the devices of the first type (i.e. any not every device of the first type). The method may then comprise monitoring the results of the new interval, to determine whether the interval is successful (e.g. not too large—and thereby causing unsuccessful downlink messages to still be sent), before rolling the calculated interval out to all devices of the first type. If the interval is not successful, the process 500 can be repeated, to recalculate an appropriate interval between periodic messages.

Monitoring the results of the new interval may comprise monitoring a success rate of subsequent downlink messages sent to the selection/subset of devices of the first type, and determining whether the success rate falls within a range of an average or acceptable success rate of messages (e.g. of the overall system according to literature or a success rate of uplink messages). A success rate may be monitored in a similar way to how success information is obtained.

In some embodiments, method 500 may further comprise a step of decreasing/increasing/modifying a timeout period for a subset of devices of the first type (e.g. above the lower bound and/or the existing timeout period of such devices) to probe if the length of the timeout period has increased or been otherwise modified by the network. Method 500 may then be repeated to thereby recalculate information about a length of the timeout period (e.g. upper and/or lower bounds).

The skilled person would be readily capable of developing an information determiner for carrying out a previously described method. Thus, each step of the flow chart may represent a different action performed by an information determiner, and may be performed by different modules of the information determiner.

Figure 6:
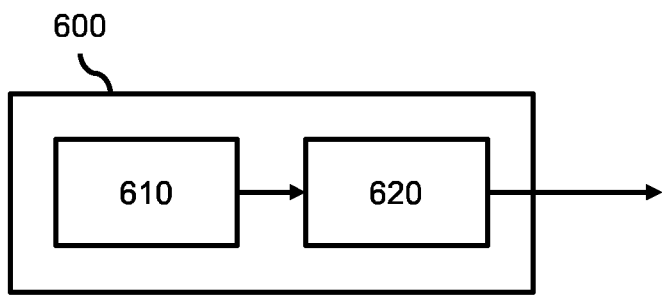
FIG. 6 illustrates an information determiner according to an embodiment.

FIG. 6 illustrates an information determiner 600 according to an embodiment. The information determiner may be installed or a component of any device capable of determining successful/unsuccessful messages sent to device(s) of the first type, and uplink message sent by the device(s) of the first type. For example, the information determiner may be a component of the network controller 120 of the network 100 illustrated in FIG. 1. It may also be possible to place the information determiner in other elements of the network system 1, such as an IoT platform 130 or application server 140.

The information determiner 600 is adapted to determining information about a length of a timeout period, the timeout period representing a period of time, following a device of a first type in a wireless network, sending an uplink message, after which the device of the first type is unable to receive a downlink message.

The information determiner 600 comprises: a collection module 610 adapted to: obtain first timing information indicating times at which historic uplink messages were sent by at least one device of the first type in the wireless network; obtain second timing information indicating times at which historic downlink messages were sent to one or more of the at least one device of the first type in the wireless network; and obtain success information indicating which of the historic downlink messages were successfully received, thereby indicating successful historic downlink messages and unsuccessful historic downlink messages, The information determiner further comprises a decision module 620 adapted to determine information about a length of the timeout period based on the first timing information, the second timing information and the success information.

As discussed above, embodiments make use of an information determiner, which may be embodied as a processor. The processor be implemented in numerous ways, with software and/or hardware, to perform the various functions required. A processor is one such example which employs one or more microprocessors that may be programmed using software (e.g., microcode) to perform the required functions. A processor may however be implemented with or without employing a processor, and also may be implemented as a combination of dedicated hardware to perform some functions and a processor (e.g., one or more programmed microprocessors and associated circuitry) to perform other functions.

Examples of processor components that may be employed in various embodiments of the present disclosure include, but are not limited to, conventional microprocessors, application specific integrated circuits (ASICs), and field-programmable gate arrays (FPGAs).

In various implementations, a processor may be associated with one or more storage media such as volatile and non-volatile computer memory such as RAM, PROM, EPROM, and EEPROM. The storage media may be encoded with one or more programs that, when executed on a computer, one or more processors and/or a processing arrangement, perform the required functions. Various storage media may be fixed within a processor or may be transportable, such that the one or more programs stored thereon can be loaded into a processor.

It will be understood that disclosed methods are preferably computer-implemented methods. As such, there is also proposed the concept of computer program comprising code means for implementing any described when said program is run on a computer. Thus, different portions, lines or blocks of code according to an embodiment may be executed by a processor/computer to perform any herein described method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The term "at least one of the following" means any combination of features following this term, e.g. "at least one of the following: A, B and C" would mean "A and/or B and/or C". A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining information about a length of a timeout period, the timeout period representing a period of time, following a device of a first type in a wireless network sending an uplink message, after which the device of the first type is unable to receive a downlink message, the method comprising:
    obtaining first timing information indicating times at which historic uplink messages were sent by at least one device of the first type;
    obtaining second timing information indicating times at which historic downlink messages were sent to one or more of the at least one devices of the first type;
    obtaining success information indicating which of the historic downlink messages were successfully received by the one or more devices of the first type, thereby indicating successful historic downlink messages and unsuccessful historic downlink messages; and
    determining information about a length of the timeout period based on the first timing information, the second timing information and the success information.

2. The method of claim 1, wherein the step of determining information about a length of the timeout period comprises:
    processing the first and second timing information to determine first differences, each first difference being a difference between a time at which a successful historic downlink message was sent to a device of the first type and a time at which a historic uplink message, temporally closest and temporally preceding a respective successful historic downlink message, was sent by the same respective device of the first type; and
    determining information about the length of the timeout period based on the determined first differences.

3. The method of claim 2, wherein the step of determining information about the length of the timeout period comprises determining that the largest of the determined first differences is a lower bound of the length of the timeout period.

4. The method of claim 1, wherein the step of determining information about a length of the timeout period comprises:
    processing the first and second timing information to determine second differences, each second difference being a difference between a time at which an unsuccessful historic downlink message was sent to a device of the first type and a time at which a historic uplink message, temporally closest and temporally preceding the respective unsuccessful historic downlink message, was sent by the same respective device of the first type; and determining information about the length of the timeout period based on the determined second differences.

5. The method of claim 4, wherein the step of determining information about the length of the timeout period comprises determining that the smallest of the determined second differences is an upper bound of the length of the timeout period.

6. The method of claim 1, wherein the step of determining information about a length of the timeout period comprises:
processing the first and second timing information to determine first differences, each first difference being a difference between a time at which a successful historic downlink message was sent to a device of the first type and a time at which a historic uplink message, temporally closest and temporally preceding the respective successful historic downlink message, was sent by the same respective device of the first type;
processing the first and second timing information to determine second differences, each second difference being a difference between a time at which an unsuccessful historic downlink message was sent to a device of the first type and a time at which a historic uplink message, temporally closest and temporally preceding the respective unsuccessful historic downlink message, was sent by the same respective device of the first type;
determining that the largest of the determined first differences is a lower bound of the length of the timeout period; and
determining that the smallest of the determined second differences is an upper bound of the length of the timeout period.

7. The method of claim 6, further comprising generating an alarm in response to the upper bound of the length of the timeout period being less than the lower bound of the length of the timeout period.

8. The method of claim 1, further comprising controlling each at least one device of the first type to send periodic uplink messages, wherein an interval between the periodic uplink messages is controlled based on the information about the length of the determined timeout period.

9. The method of claim 8, wherein the controlling each one or more of the devices of the first type comprises:
identifying any devices of the first type that are currently sending periodic uplink messages;
determining, for each identified device, a current interval between the periodic uplink messages; and
controlling, for each identified device, a length of the interval between the periodic uplink messages further based on the respective current interval of that identified device.

10. The method of claim 3, further comprising:
controlling each at least one device of the first type to send periodic uplink messages; and
controlling the interval between the periodic uplink messages to be no less than the lower bound of the length of the timeout period.

11. The method of claim 10 wherein the controlling each at least one device of the first type comprises:
identifying any devices of the first type that are currently sending periodic uplink messages;
determining, for each identified device, a current interval between the periodic uplink messages; and
controlling, for each identified device, a length of the interval between the periodic uplink messages to be equal to the lower bound of the length of the timeout period in response to the current interval being less than the lower bound of the length of the timeout period.

12. The method of claim 5, further comprising:
controlling each at least one device of the first type to send periodic uplink messages; and
controlling the interval between the periodic uplink messages to be less than the upper bound of the length of the timeout period.

13. The method of claim 6, further comprising controlling each at least one device of the first type to send periodic uplink messages, wherein the controlling comprises:
identifying any devices of the first type that are currently sending periodic uplink messages;
determining, for each identified device, a current interval between the periodic uplink messages; and
controlling the interval between the periodic uplink messages to be no less than the lower bound of the length of the timeout period and less than the upper bound of the length of the timeout period.

14. A non-transitory computer readable medium comprising code means for implementing the method of claim 1 when said program is run on a computer.

15. An information determiner adapted to determining information about a length of a timeout period, the timeout period representing a period of time, following a device of a first type in a wireless network, sending an uplink message, after which the device of the first type is unable to receive a downlink message, the information determiner comprising:
a collection module adapted to:
obtain first timing information indicating times at which historic uplink messages were sent by at least one device of the first type in the wireless network;
obtain second timing information indicating times at which historic downlink messages were sent to one or more of the at least one device of the first type in the wireless network; and
obtain success information indicating which of the historic downlink messages were successfully received, thereby indicating successful historic downlink messages and unsuccessful historic downlink messages, and
a decision module adapted to determine information about a length of the timeout period based on the first timing information, the second timing information and the success information.

* * * * *